Dec. 7, 1926.

A. E. NORRIS

1,609,421

CLUTCH AND BRAKE MECHANISM

Filed August 13, 1925   5 Sheets-Sheet 1

Inventor:
Almon E. Norris,

Patented Dec. 7, 1926.

1,609,421

UNITED STATES PATENT OFFICE.

ALMON E. NORRIS, OF BROOKLINE, MASSACHUSETTS.

CLUTCH AND BRAKE MECHANISM.

Application filed August 13, 1925. Serial No. 49,995.

This invention relates to a novel clutch and brake mechanism, susceptible of general application, but having special utility in connection with two-drum winches, sometimes called burtoning winches, used for loading and unloading vessels at docks.

The invention will be best understood by reference to the following description, when taken in connection with the accompanying drawings of one specific embodiment thereof, while its scope will be more particularly pointed out in the appended claims.

Figure 1:
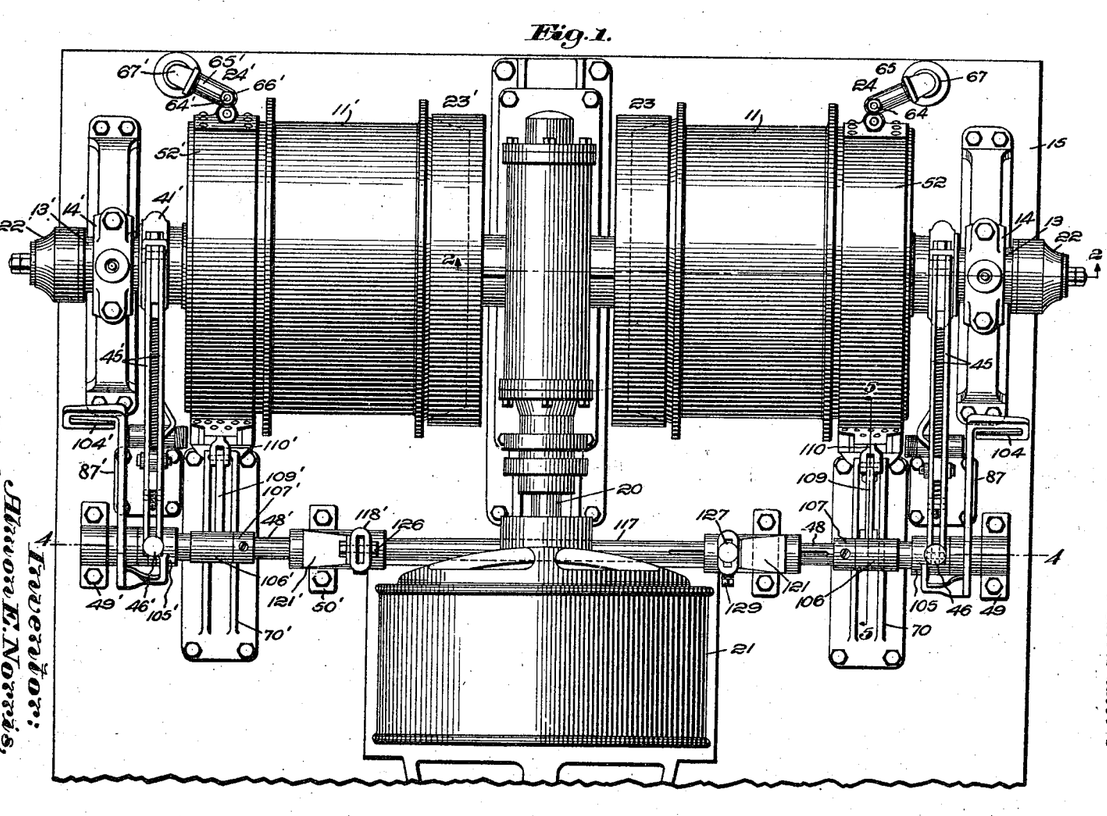
Fig. 1 is a plan of a clutch and brake mechanism exemplifying the invention, the same being shown in connection with a two-drum winch.

Referring now to the drawings, and to the embodiment of the invention which is selected for exemplification, and having reference at first more particularly to Fig. 1, there are shown two rotors, herein drums 11 and 11', which in the present example are coaxially aligned and loosely mounted on a shaft 12 (see Fig. 2), the latter being mounted in bearings 13 and 13', which in turn are mounted in bearing brackets 14 and 14', supported on a suitable base 15.

Herein the shaft is constantly driven by mechanism comprising a worm gear 16 (see Fig. 2), secured to the shaft as by a key 17, and driven by a worm 18, the gearing being enclosed by an appropriate housing or gear case 19. The worm is suitably formed on or secured to a shaft 20, which is driven by an appropriate motor 21 (see Fig. 1), preferably an electric motor mounted on the base 15, on which the gear case is mounted. Lengthwise movement of the shaft 12 is prevented by thrust bearings 22 and 22', one of which is shown in Fig. 2 in section, while the exterior of each is shown in Fig. 1.

The two drums are independently driven in one direction by clutches designated generally by the numerals 23 and 23' (see Fig. 1). Rotation of the drums in a reverse direction is normally prevented by self-acting, or automatic brakes designated generally by the numerals 24 and 24', which, however, as will more fully appear hereinafter, may be released by the operator, thereby to permit reverse rotation at any desired speed. These two clutch and brake mechanisms (except for the fact that one is arranged right-handed and the other left-handed, and except for the further fact that there are some slight differences in the arrangement of their controlling levers), are identical in construction, and a detailed description of the set used for the control of the drum 11 will suffice for both.

Figure 2:
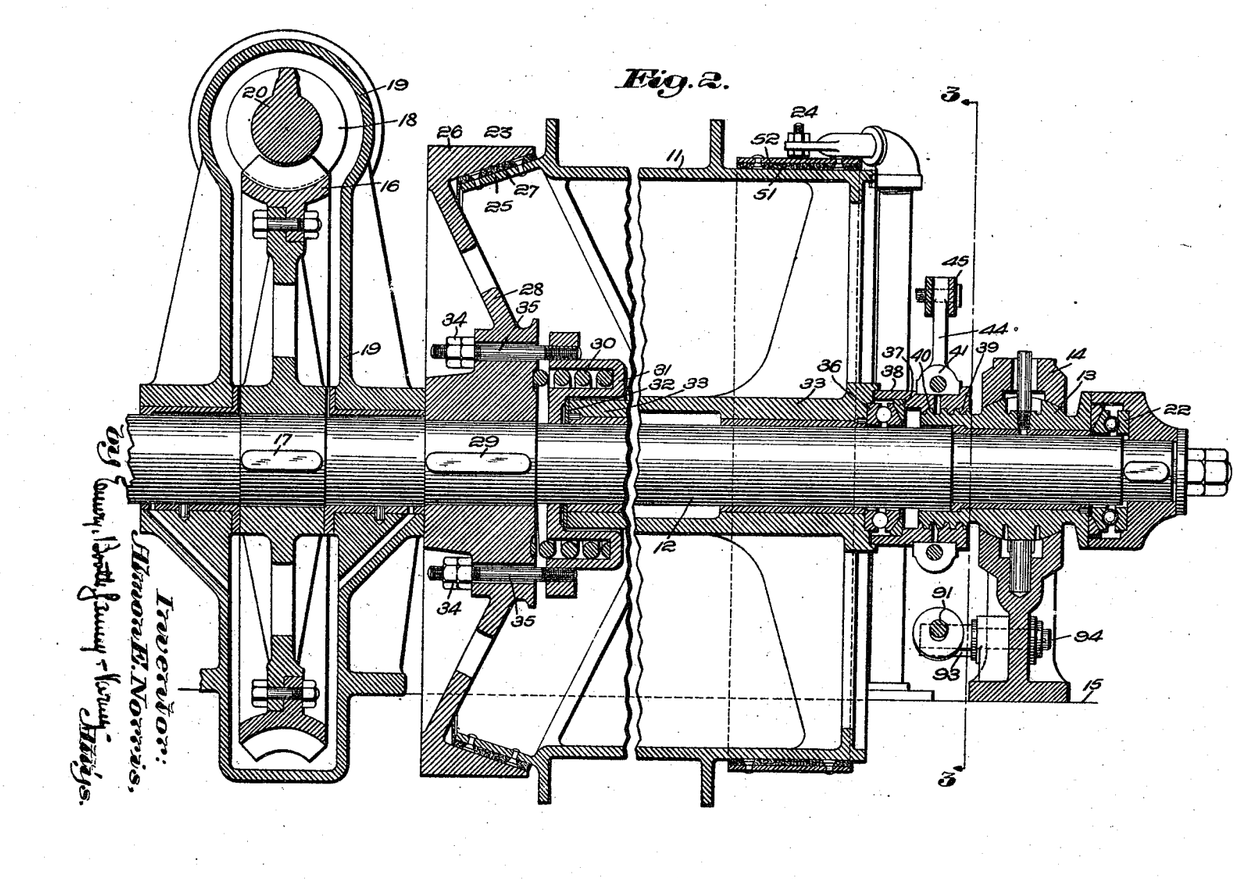
Fig. 2 is a sectional view on an enlarged scale, on line 2—2 of Fig. 1.

Referring now to Fig. 2, the clutch 23, herein of the cone type, comprises inner and outer cones 25 and 26, the inner one being conveniently formed as an integral part of the drum 11, and being provided with a facing 27 of appropriate material, and the outer one being formed as an integral part of a clutch member 28, which is secured as by a key 29 to the shaft 12. Engagement and disengagement of the clutch are effected by sliding the drum and the clutch member carried thereby axially on the shaft 12. The clutch is normally disengaged by a spring 30, one end of which bears against the hub of the clutch member 28, and the other end against a yoke 31, which in turn operates through a thrust washer 32 against the inner end of a hub 33 presented by the drum 11. Movement of the yoke under the influence of the spring is limited by suitable means, herein stops comprising nuts 34 threaded onto studs 35, which extend loosely through the clutch member 28, and are fixedly secured to the yoke, as by being screwed into the latter.

Engagement of the clutch in opposition to the spring is effected by suitable mechanism, such as that now to be described. At the outer end of the drum 11, is a thrust bearing 36, which is interposed between the hub 33 and a shoulder 37 presented by a sleeve 38, which also presents a nut 39 threaded onto a screw 40 presented by the inner end of the bearing 13. Inasmuch as the bearing is fixed against axial movement, rotation of the nut in the proper direction will cause the latter to be moved axially, and to operate through the thrust bearing 36 to move the drum 11 inward against the yielding resistance presented by the spring 30, and thereby to cause driving engagement of the clutch members.

Figure 3:
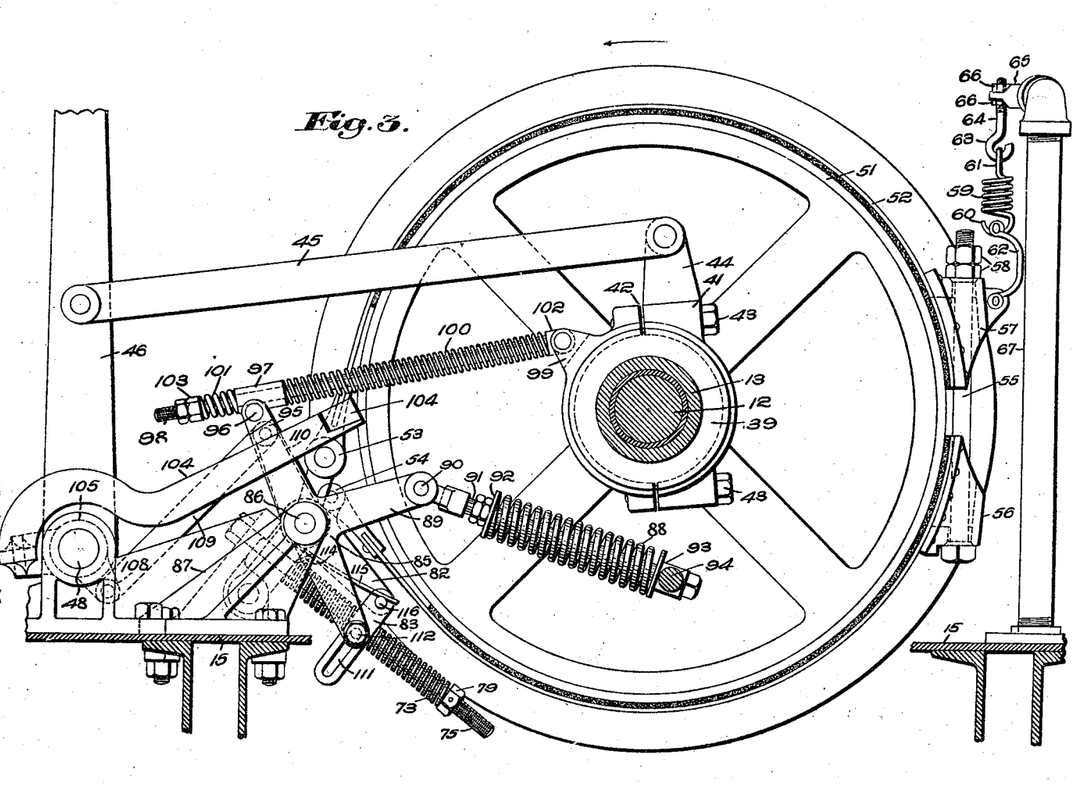
Fig. 3 is a sectional view on line 3—3 of Fig. 2.
Figure 4:
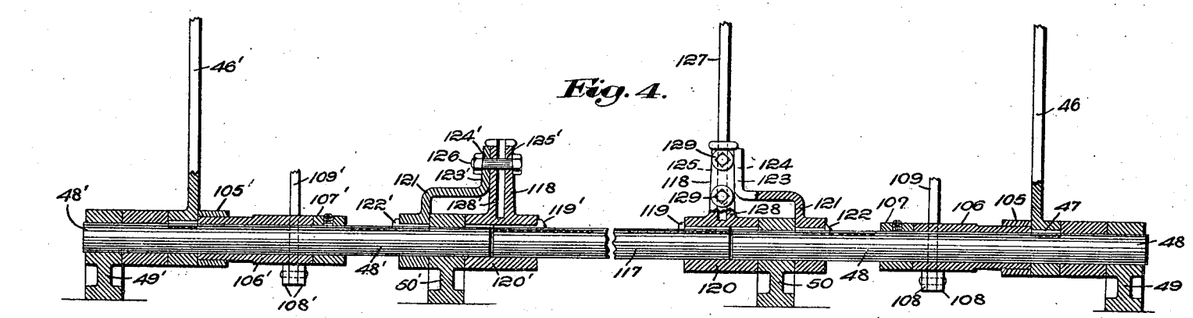
Fig. 4 is a sectional view on line 4—4 of Fig. 1.

Rotation of the nut in the present example is accomplished by mechanism now to be described, reference being had at first to Fig. 2. Encircling the sleeve 38, in which the nut is formed, is a collar, conveniently in the form of a clamping band 41, which, as shown in Fig. 3, is split at 42, and is provided with clamping screws 43, by means of which it may be clamped onto the sleeve. This clamping band carries an arm 44, herein conveniently formed as an integral part thereof, whose outer end is pivotally connected to one end of a link 45, while the opposite end of this link is pivotally connected to a hand lever 46, which, as best shown in Fig. 4, is secured as by a key 47 to a rockshaft 48, the latter being mounted in bearings 49 and 50, secured to the base of the machine.

The machine is intended ordinarily to be operated by two operators, who stand at opposite sides, respectively, of the motor 21, at the portions of the base which appear in Fig. 1, at the lower right and left-hand sides of this figure. The arrangement of the mechanism just described is such that, if the operator at the right-hand side of the machine grasps the clutch-operating lever 46 and pulls it toward him, the clutch 23 is engaged; while, on the other hand, if he moves the lever from him, the clutch is disengaged. The operating mechanism for the clutch 23' is like that for the clutch 23 just described, and for convenience its parts are designated by corresponding reference numerals, to which the index prime (') has been added.

The brakes will now be described, in detail, reference being had at first to Fig. 3. Except for the fact that one brake is arranged right-handedly and the other left-handedly, the brakes are substantially alike in construction and operation, and hence a description of one will suffice for both. The brake 24 comprises a brake-drum 51 (see Fig. 2), which cooperates with a brake member, herein exemplified by a brakeband 52, which, as shown in Fig. 3, is provided with two relatively movable terminals 53 and 54. If desired, the band may be provided with an adjustable take-up, herein exemplified by a bolt 55 (shown at the right-hand side of Fig. 3), extending through lugs 56 and 57 on two distinct parts of the band, said bolt being provided with adjusting nuts 58. The band is yieldingly supported by a spring 59, presenting two hooks 60 and 61, one being connected by a link 62 to the lug 57, and the other being hooked onto an eye 63 presented by an eye-bolt which extends through a support 65, and nut 66, threaded onto the bolt above and below the support, securing the bolt to the latter. The support comprises an upright standard 67, secured to the base 15 of the machine.

In the present example, the brake is normally automatic in its operation, that is to say, free rotation of the drum is permitted in one direction under the influence of the motor and clutch hereinbefore described,—in the direction of the arrow at the upper portion of Fig. 3, but rotation in the opposite direction is normally prevented in a manner which will presently appear. The brakeband terminals 53 and 54 are differentially connected to a hanger, herein a link 68, best shown in Fig. 5, which is pivoted at 69 on a suitable fixed support such as a bracket 70, mounted on the base of the machine. The terminal 53 is connected by one or more, herein a pair of links 71 and a pivot 72 to the link 68. The terminal 54 is connected to the link in a manner which will presently appear.

A suitably arranged spring 73 urges the link 68 toward the left (Fig. 5), that is to say, contraclockwise about its pivot 69, but in a generally clockwise direction, considered with reference to the brake drum. Movement of the links in such direction is limited by an appropriate stop 74, herein conveniently formed as an integral part of the bracket 70. The spring selected for exemplification is helically coiled about a rod 75, which passes freely through an opening 76 provided in the link, and thence through the bracket, which presents a mounting therefor.

Figure 5:
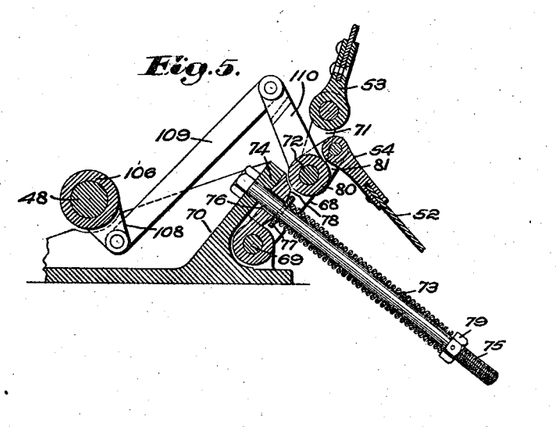
Fig. 5 is a sectional view on an enlarged scale, on line 5—5 of Fig. 1.

One end of the spring rests against a suitable abutment, herein a washer 77 encircling the rod, and resting against an appropriately curved surface 78, which permits limited rocking movement of the link with relation to the rod. The other end of the spring rests against a suitable abutment, herein a nut 79 threaded onto the rod.

Relative arrangement of the brake parts thus far described is such that when the brake-drum has rotated contraclockwise, as viewed in Fig. 3, the spring 73 yields and allows the link 68 to swing toward the right (see Fig. 5), the differential action of the brake-band thereby permitting the brakeband to relax. When, however, there is any tendency of the brake-drum to rotate clockwise, such tendency is resisted by automatic application of the brake.

Figure 6:
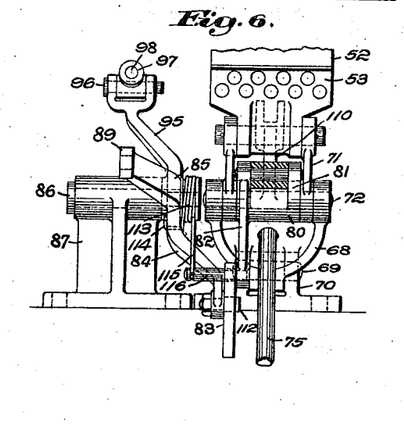
Fig. 6 is an elevation of some of the parts shown in Fig. 5, as viewed from the right-hand side thereof.

The brake may be released at will, however, by moving the terminal 54 contraclockwise, considered with reference to the brake-drum. This is conveniently accomplished by connecting the terminal 54 to the link 68, by means of a rocking lever 80 having two short arms 81, which are located side by side and embrace the terminal. The link 68 is bifurcated to embrace the rocking lever 80, as well as the links 71 (see Fig. 6).

When the lever 80 is rocked clockwise about its fulcrum (Fig. 5), its arms 81 swing toward the right, and the brake-band is relaxed, thereby freeing the brake-drum and allowing it to rotate clockwise. It should here be understood that this release of the brake is effected without disturbing the spring 73 and the link 68,—that is to say, it is accomplished irrespective of the action of the automatic brake-applying means.

The brake-releasing lever is manually controlled by mechanism now to be described, reference being had more particularly to Fig. 3. The brake-releasing lever 80 is provided with a second arm 82, which is connected by a link 83 to one arm 84 of a three-armed lever 85, which is fulcrumed on a pivot 86 mounted on a bracket 87, the latter being fixed on the base 15 of the machine. The link is arranged generally parallel with a straight line containing the centers of the pivots of the link 68 and lever 80, and hence does not interfere with the releasing action of the brake.

Brake-releasing movement of the lever 85 is yieldingly resisted by a spring 88, which is connected to the lever, as by providing the same with a second arm 89 connected by a pivot 90 to a rod 91, which carries an abutment 92 against which one end of the spring rests, while the other end of the spring is seated against an abutment 93, in which the rod is mounted to slide. The abutment 93 is provided with a pivot 94, which, as shown in the lower right-hand portion of Fig. 2, turns in a bearing provided therefor in the bearing bracket 14. When, therefore, the arm 89 (see Fig. 3) swings to and fro, the rod 91 slides backward and forward in the guide 93, and the latter rocks on its pivotal mounting.

The release of the brake in opposition to the yielding resistance presented by the spring 73 is effected by the hand lever 46, which operates the clutch, the control of the machine thereby being greatly simplified as compared with former practices. The mechanism by which this is accomplished will now be described, reference being had to Fig. 3. The lever 85 is provided with a third arm 95, connected by a pivot 96 to a sleeve 97, the latter being mounted to slide lengthwise on a rod 98, which is in the nature of a link connecting said arm to an arm presented by a pair of ears 99 carried by the collar 41, which it will be remembered is clamped on the clutch operating nut.

The hand lever 46 is yieldingly maintained in its normal position by two springs 100 and 101, encircling the rod 98, and interposed between the sleeve 97 and abutments 102 and 103 carried by the rod 98. When the collar 41 is turned clockwise by the use of the hand lever 46, it tends to place the spring 101 under compression, and in so doing effects release of the brake, inasmuch as it rocks the three-armed lever 85 clockwise about its pivot, and the latter acts through the link 83 to rock the brake-releasing lever in the same direction. Since the releasing movement is through the interposition of the spring 101, the release and reapplication of the brake can be controlled to a nicety, and it can be applied and released much more gradually and sensitively than would otherwise be possible. The brake 24' is generally similar to the brake 24, and it is therefore deemed unnecessary to show and to describe the same in detail, but for convenience, corresponding parts wherever shown are given corresponding reference numerals with the addition of the index prime (').

Herein, means are provided to supplement the automatic application of the brake by additional pressure applied by the operator, and by the use of a pedal 104 (see Fig. 3) having a hub 105 (see Fig. 4) fixedly secured to a sleeve 106, which loosely surrounds the shaft 48, and is held against movement in one direction by the hub of the lever 46, and in the opposite direction by a collar 107 secured to the shaft. The sleeve presents an arm comprising two ears 108, which are connected by a link 109 to an arm 110 (see Fig. 5) of the brake-releasing lever 80. When, therefore, the operator depresses the pedal, the arm 81 of the brake-releasing lever is swung contra-clockwise, as viewed in Fig. 5, and thereby acts to tighten the brake-band by exerting a pull on the brake-band terminal 54. It will be remembered, however, that the arm 82 of the lever 80 is connected by a link 83 to the arm 84 of the three-armed lever 85. The link 83 is provided with a slot 111, which receives a pin 112 carried by the arm 84. Normally this pin is maintained at the upper end of the slot by an appropriate spring 113, herein helically coiled about the pivot 86 (see Fig. 6), and having two arms 114 and 115, one engaging the arm 84, and the other the pin 116, which is a prolongation of the pivot connecting the link 83 to the arm 82. When, therefore, the pedal is depressed to furnish additional braking pressure, the described spring yields and permits the link 83 to be carried in an upward direction by the arm 82, without imparting any movement to the arm 84 of the three-armed lever. In other words, the additional braking pressure is applied without disturbing the manually operable mechanism, including the hand lever which controls the clutch and the releasing of the automatic brake. If now, when the load is being held by the automatic application of the brake, the latter should slip, additional pressure may be applied by depressing the pedal. A like pedal-operated mechanism is provided for the left-hand brake, like parts being designated by like numerals with the addition of the index prime (').

Under some circumstances, it is desirable for a single operator to operate both clutches and both brakes. To this end, I have provided auxiliary controlling means which will now be described, reference being had to Fig. 4. The shafts 48 and 48' are axially aligned with each other, but are distinct from each other. They may be coupled together, however, by the use of an intermediate shaft 117, to which arms 118 and 118' are secured, as by keys 119 and 119'. These arms are provided with hubs 120 and 120', which are loosely mounted on adjacent ends of the shafts 48 and 48'.

The intermediate shaft 117 may be coupled to either of the shafts 48 and 48' by coupling means now to be described, still referring to Fig. 4. Arms 121 and 121', secured to the shafts 48 and 48' as by keys 122 and 122', are provided with offset portions 123 and 123', which present openings 124 and 124', adapted to register with similar openings 125 and 125' in the arms 118 and 118'. These openings are adapted to receive a bolt 126. In Fig. 4, this bolt is shown attaching the arms 118' and 121' together. The bolt may be used in a similar way to couple the arms 118 and 121 together. When the bolt is used to couple the arms 118' and 121' together, as in Fig. 4, the machine is adapted for control by a single operator. To this end, the arm 118 is provided with a handle 127, and inasmuch as the arm 118 is keyed to the shaft 117, and the latter is coupled to the shaft 48', a single operator can control both clutches and both brakes by the use of the handles 46 and 127.

The handle 127 may be secured to either of the arms 118 and 118', as by providing them with sockets 128 and 128' to receive the handle. The handle may be secured in place in either socket, as by set-screws exemplified by the set-screws 129, which secure the handle in the socket 128.

When the handle 127 is transferred to the left-hand socket and the bolt 126 is transferred to the right-hand arms, the operator standing at the left-hand side of the machine can control both clutches and both brakes. On the other hand, if two operators are operating the machine, the bolt 126 is removed altogether, and laid aside, so that the intermediate shaft 117 no longer couples the shafts 48 and 48' together.

Figure 7:
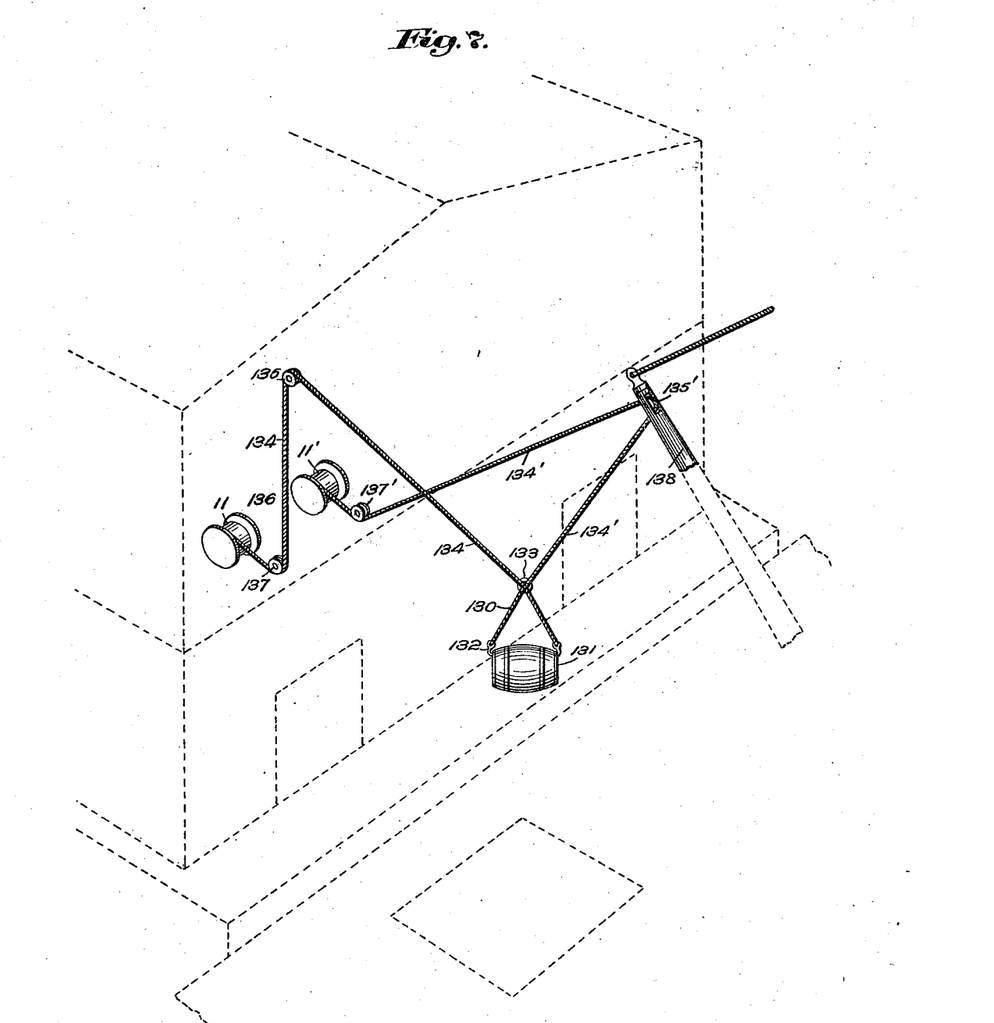
Fig. 7 is a perspective view, representing in a somewhat conventionalized manner the general arrangement of a load-handling apparatus in connection with which the clutch and brake mechanism may be employed, portions of a vessel, and of a dock, or rail-hoist, being indicated in dotted lines.

As already indicated, the clutch and brake mechanism has special utility in connection with load-handling apparatus employed for a class of work commonly called "burtoning". In Fig. 7, there is illustrated an application of the mechanism to this use, and there is shown a load carrier exemplified by a sling 130, although there may be employed in this connection a skip tackle bucket, or other suitable device, attached to the load, herein exemplified by a cask 131, to which the sling is attached as by hooks 132. Herein, the sling presents an eye 133, affording a convenient point of attachment for two ropes 134 and 134', one of which extends in one direction to a supporting and guiding sheave wheel 135', and thence to what may be conveniently termed a controlling stand, which is merely the position where the described controlling apparatus is located, and which, in Fig. 7, is designated generally by the numeral 136. At this controlling stand, there is a guiding sheave wheel 137, to which the rope 134 leads from the sheave wheel 135, and the rope leads thence to the winding drum 11, to which the rope is secured or dead-ended. The other rope 134' leads from the load carrier in the opposite direction over a supporting and guiding sheave wheel 135', thence over a guiding sheave wheel 137', and thence to the second winding drum 11'', to which it is secured or dead-ended. The controlling stand may be conveniently located on the second floor of the dock or warehouse, while the relatively remote supporting and guiding sheave wheel 135' may be mounted on a boom 138, such as those commonly employed for such purposes on freight carrying vessels.

In the operation of the apparatus, in and out movement of the load is accomplished by hauling in one rope and paying out the other. If the linear speed of both ropes is equal, the load will be moved horizontally without substantial vertical movement. If, on the other hand, both ropes are hauled in or paid out simultaneously and at equal linear speed, the load will be raised or lowered, as the case may be. Any desired combination of these horizontal and vertical movements of the load can be obtained, and the load caused to travel in any desired path by a proper relative control of the two ropes.

Assuming the load carrier to have been attached to the load within the hold of the vessel, the first operation is to move the load vertically through and beyond the hatchway of the vessel to a sufficient height above the deck. This is accomplished by winding in both ropes or cables simultaneously. To do this, both operators (in case there are two) pull their control levers toward them, thereby causing engagement of the clutches, whereupon power is transmitted to the drums and the cables are wound in at the same linear speed. When the load has reached a sufficient height to clear the hatchway, and no obstacles are presented by the vessel, it may be caused to travel inward toward the dock in any desired path by proper manipulation of the levers. For example, if it should be desired to carry the load in a direct horizontal path toward the dock, the left-hand lever is thrown forward, thereby disengaging the clutch as well as the automatic brake of the left-hand drum, while the right-hand controlling lever is pulled toward the operator, thereby engaging the right-hand clutch, and causing the right-hand drum to wind in its rope at the same speed that the other rope is paid out. However, the left-hand controlling lever is utilized as may be necessary to cause application of the automatic brake as required to make sure that the left-hand rope does not pay out any more rapidly than the right-hand rope is wound in. If at any time while either automatic brake is in operation it should slip, the operator can avail himself of the pedal to bring increased brake pressure to bear on the drum.

Having thus described one embodiment of my invention, but without limiting myself thereto, what I claim and desire by Letters Patent to secure is:

1. The combination of two rotors; two clutches for rotating said rotors, respectively; two automatic brakes for said rotors, respectively, each having means to resist rotation in one direction but to permit free rotation in the opposite direction; two clutch and brake controlling levers; means connecting each lever to its associated clutch and brake to cause movement of said lever in one direction to engage said clutch and to cause movement of said lever in the opposite direction to disengage said clutch and further movement in the latter direction to release said brake; a third lever; and means to enable said third lever to be coupled to either of the other two levers.

2. The combination of two rotors; two clutches for rotating said rotors, respectively; two automatic brakes for said rotors, respectively, each having means to resist rotation in one direction but to permit free rotation in the opposite direction; two clutch and brake controlling rockers; means connecting each rocker to its associated clutch and brake to cause movement of said rocker in one direction to engage said clutch and to cause movement of said lever in the opposite direction to disengage said clutch and further movement in the latter direction to release said brake; a controlling lever; and means to enable said lever to be coupled to either of said rockers.

3. The combination of two rotors; two clutches for rotating said rotors, respectively; two automatic brakes for said rotors, respectively, each having means to resist rotation in one direction but to permit free rotation in the opposite direction; two clutch and brake controlling rockers; means connecting each rocker to its associated clutch and brake to cause movement of said rocker in one direction to engage said clutch and to cause movement of said lever in the opposite direction to disengage said clutch and further movement in the latter direction to release said brake; an intermediate rocker; a controlling lever for operating said intermediate rocker; and means to enable said intermediate rocker to be coupled to either of the other two rockers.

4. The combination of two rotors; two clutches for rotating said rotors, respectively; two automatic brakes for said rotors, respectively, each having means to resist rotation in one direction but to permit free rotation in the opposite direction; two clutch and brake controlling rockers; means connecting each rocker to its associated clutch and brake to cause movement of said rocker in one direction to engage said clutch and to cause movement of said lever in the opposite direction to disengage said clutch and further movement in the latter direction to release said brake; a controlling lever; an intermediate rocker presenting means for the attachment of said lever thereto in either of two positions; and means to enable said intermediate rocker to be coupled to either of the other two rockers.

5. The combination of two rotors; two clutches for rotating said rotors, respectively; two automatic brakes for said rotors, respectively, each having means to resist rotation in one direction but to permit free rotation in the opposite direction; two clutch and brake controlling rockers; means connecting each rocker to its associated clutch and brake to cause movement of said rocker in one direction to engage said clutch and to cause movement of said lever in the opposite direction to disengage said clutch and further movement in the latter direction to release said brake; a controlling lever; an intermediate rocker presenting sockets for the attachment of said lever thereto in either of two positions; and means to enable said intermediate rocker to be coupled to either of the other two rockers.

6. The combination of two rotors; two clutches for rotating said rotors, respectively; two automatic brakes for said rotors, respectively, each having means to resist rotation in one direction but to permit free rotation in the opposite direction; two clutch and brake controlling levers each associated with one of said clutches and one of said brakes; and means connecting each lever to its associated clutch and brake to cause movement of said lever in one direction to engage said clutch and to cause movement of said lever in the opposite direction to disengage said clutch and further movement in the latter direction to release said brake.

7. The combination of a rotor; an automatic brake for said rotor having means to resist rotation in one direction but to permit free rotation in the opposite direction; a controlling lever; means connecting said lever to said brake to enable said lever to release said brake to permit rotation in the first-mentioned direction; a second lever; and means connecting said second lever to said brake to permit the application of a braking force additional to that afforded by the automatic application of said brake.

8. The combination of a rotor; an automatic brake for said rotor having means to resist rotation in one direction but to permit free rotation in the opposite direction; two brake controlling levers; and means connecting said levers to said brake to enable one lever to release said brake to permit rotation in the first-mentioned direction and to enable the other lever to apply a braking force additional to that afforded by the automatic application of said brake.

9. The combination of a rotor; an automatic brake for said rotor having means rendering the same effective in one direction and ineffective in the opposite direction, said means including a rocker which is moved bodily in the automatic application of said brake; means for rocking said rocker about its axis in one direction to effect the release of said brake; and means for rocking said rocker about its axis in the opposite direction to apply a braking force additional to that afforded by the automatic application of said brake.

10. The combination of a rotor; an automatic brake for said rotor having means rendering the same effective in one direction and ineffective in the opposite direction, said means including a rocker which is moved bodily in the automatic application of said brake; an actuator for rocking said rocker about its axis in one direction to effect the release of said brake; an actuator for rocking said rocker about its axis in the opposite direction to apply a braking force additional to that afforded by the automatic application of said brake; and means providing for movement of one of said actuators without disturbing the other.

11. The combination of a rotor; an automatic brake for said rotor having means rendering the same effective in one direction and ineffective in the opposite direction, said means including a rocker which is moved bodily in the automatic application of said brake; an actuator for rocking said rocker about its axis in one direction to effect the release of said brake; an actuator for rocking said rocker about its axis in the opposite direction to apply a braking force additional to that afforded by the automatic application of said brake; and a loose connection between said rocker and the first-mentioned actuator providing for the second-mentioned rocking of said rocker without disturbing the first-mentioned actuator.

In testimony whereof, I have signed my name to this specification.

ALMON E. NORRIS.